(12) United States Patent
Abdallah et al.

(10) Patent No.: US 8,676,382 B2
(45) Date of Patent: Mar. 18, 2014

(54) APPLYING WORKSPACE LIMITATIONS IN A VELOCITY-CONTROLLED ROBOTIC MECHANISM

(75) Inventors: Muhammad E. Abdallah, Houston, TX (US); Brian Hargrave, Dickinson, TX (US); Robert J. Platt, Jr., Cambridge, MA (US)

(73) Assignees: GM Global Technology Operations LLC, Detroit, MI (US); The United States of America as Represented by the Administrator of the National Aeronautics and Space Administration, Washington, DC (US)

(*) Notice: Subject to any disclaimer, the term of this patent is extended or adjusted under 35 U.S.C. 154(b) by 427 days.

(21) Appl. No.: 12/787,479

(22) Filed: May 26, 2010

(65) Prior Publication Data

US 2011/0295419 A1    Dec. 1, 2011

(51) Int. Cl.
*G05B 15/00* (2006.01)
*G05B 19/00* (2006.01)

(52) U.S. Cl.
USPC .............. 700/262; 700/255; 700/245; 901/29

(58) Field of Classification Search
USPC .............................. 901/29; 700/245, 255, 262
See application file for complete search history.

(56) References Cited

U.S. PATENT DOCUMENTS

| | | | |
|---|---|---|---|
| 4,704,694 A | 11/1987 | Czerniejewski | |
| 5,579,444 A * | 11/1996 | Dalziel et al. | 700/259 |
| 6,278,908 B1 | 8/2001 | Durham | |
| 6,860,169 B2 | 3/2005 | Shinozaki | |
| 7,136,722 B2 | 11/2006 | Nakamura et al. | |
| 7,313,463 B2 | 12/2007 | Herr et al. | |
| 7,353,082 B2 | 4/2008 | Pretlove et al. | |
| 7,421,314 B2 | 9/2008 | Stoddard et al. | |
| 2005/0149251 A1 * | 7/2005 | Donath et al. | 701/200 |
| 2005/0246062 A1 | 11/2005 | Keibel | |
| 2006/0142657 A1 * | 6/2006 | Quaid et al. | 600/424 |
| 2009/0118864 A1 | 5/2009 | Eldridge et al. | |
| 2009/0243413 A1 * | 10/2009 | Gilchrist et al. | 310/90.5 |

FOREIGN PATENT DOCUMENTS

| | | |
|---|---|---|
| JP | 62134707 A | 6/1987 |
| JP | 63245507 A | 10/1988 |
| JP | 1121909 A | 5/1989 |
| JP | 9314305 A | 12/1997 |
| JP | 11347983 A | 12/1999 |
| JP | 2005028492 A | 2/2005 |
| JP | 2009093352 A | 4/2009 |

* cited by examiner

*Primary Examiner* — Behrang Badii
*Assistant Examiner* — Daniel L Greene
(74) *Attorney, Agent, or Firm* — Quinn Law Group, PLLC

(57) ABSTRACT

A robotic system includes a robotic mechanism responsive to velocity control signals, and a permissible workspace defined by a convex-polygon boundary. A host machine determines a position of a reference point on the mechanism with respect to the boundary, and includes an algorithm for enforcing the boundary by automatically shaping the velocity control signals as a function of the position, thereby providing smooth and unperturbed operation of the mechanism along the edges and corners of the boundary. The algorithm is suited for application with higher speeds and/or external forces. A host machine includes an algorithm for enforcing the boundary by shaping the velocity control signals as a function of the reference point position, and a hardware module for executing the algorithm. A method for enforcing the convex-polygon boundary is also provided that shapes a velocity control signal via a host machine as a function of the reference point position.

14 Claims, 3 Drawing Sheets

US 8,676,382 B2

APPLYING WORKSPACE LIMITATIONS IN A VELOCITY-CONTROLLED ROBOTIC MECHANISM

STATEMENT REGARDING FEDERALLY SPONSORED RESEARCH OR DEVELOPMENT

This invention was made with government support under NASA Space Act Agreement number SAA-AT-07-003. The government may have certain rights in the invention.

TECHNICAL FIELD

The present invention relates to the control of a wrist assembly or other robotic mechanism within a robotic system.

BACKGROUND OF THE INVENTION

Dexterous robots are able to precisely grasp and manipulate objects using a series of linkages, which in turn are interconnected via one or more motor-driven robotic joints. End-effectors are the particular linkages used to perform a given task at hand, such as grasping and maneuvering a work tool or other object. Humanoid robots are a particular type of dexterous robot having an approximately human structure, e.g., a full body, torso, hand(s), and/or another appendage(s). The structural and control complexity of any robotic system is largely dependent upon commanded work tasks, and therefore dexterous robots present a substantially greater control challenge relative to the control of conventional robots.

Dexterous robots may include one or more end effectors, such as a robotic wrist assembly having an open wrist joint, the proper control of which can enable a more precise handling of a grasped object. An open wrist joint results in wrist degrees of freedom that are actuated by indirect drives in a closed-chain mechanism. The mapping between the actuator space of any velocity-controlled wrist actuators and the joint space itself is thus coupled and nonlinear, as is understood in the art. Therefore, such a wrist joint can end up having an irregularly-shaped permissible workspace. Stable operation of a robotic mechanism operating within such a workspace is paramount to the optimal functioning of the robotic system.

SUMMARY OF THE INVENTION

Accordingly, a software-based method is provided herein for enforcing a complex-polygon workspace boundary of a velocity-controlled robotic mechanism, e.g., a robotic wrist assembly that is responsive to velocity control signals. The present method is applicable to any coupled and complex workspace wherein the degrees of freedom (DOF) of the robotic mechanism are actuated by coupled and non-direct joint actuators. Due to the coupled mapping between the DOFs and the joint actuators, the boundaries of the workspace are implemented in software rather than as simple hard stops. Although a closed-chain wrist mechanism is used herein for illustrative purposes, the present method may also be applied to the operational space of any serial chain manipulator.

The complex workspace of the robotic mechanism is defined herein by a convex-polygon, i.e., a convex set defined by n corners in real vector space, as is well understood in the mathematical arts. A convex-polygon workspace may provide the robotic mechanism with a greatly increased range of motion of relative to a conventional rectangular workspace. Additionally, the method eliminates software-induced sticking, slipping, and chattering along the boundary, i.e., along the edges and in the corners of the workspace.

In particular, a robotic system is provided herein that includes a robotic mechanism. The robotic mechanism is responsive to velocity control signals, and has a permissible workspace, i.e., a workspace that is simultaneously dependent on multiple joints of the mechanism. Within the system, a host machine determines a position of a reference point on the robotic mechanism with respect to the boundary. The host machine includes an algorithm for enforcing the boundary by automatically shaping the velocity control signals as a function of the reference point position with respect to the boundary, thereby providing a smooth and unperturbed operation of the robotic mechanism along the edges and corners of the boundary.

A host machine is also provided that is adapted for use within a robotic system. As noted above, the system includes a robotic mechanism that is responsive to velocity control signals. The host machine includes a hardware module that is electrically connected to the robotic mechanism, and that determines a position of reference point on the robotic mechanism with respect to the complex-polygon boundary, e.g., using joint sensors or other sensors. The host machine includes an algorithm for enforcing the boundary. Execution of the algorithm by the hardware module automatically shapes the velocity control signals as a function of the reference point position with respect to the boundary, thereby providing a smooth and unperturbed operation of the robotic mechanism along the edges and within the corners of the boundary. Transitional buffers applied near the edges and corners of the boundary ensure stable, non-chattering performance, especially with high speeds and/or external forces.

A method is also provided for enforcing the convex-polygon boundary noted above. The method includes determining whether the reference point on the mechanism lies within the boundary, and automatically shaping the velocity control signal(s) as a function of the distance of the reference point relative to the boundary, thereby ensuring a smooth and unperturbed operation of the robotic mechanism along the edges and corners of the boundary.

The above features and advantages and other features and advantages of the present invention are readily apparent from the following detailed description of the best modes for carrying out the invention when taken in connection with the accompanying drawings.

DETAILED DESCRIPTION

Figure 1:
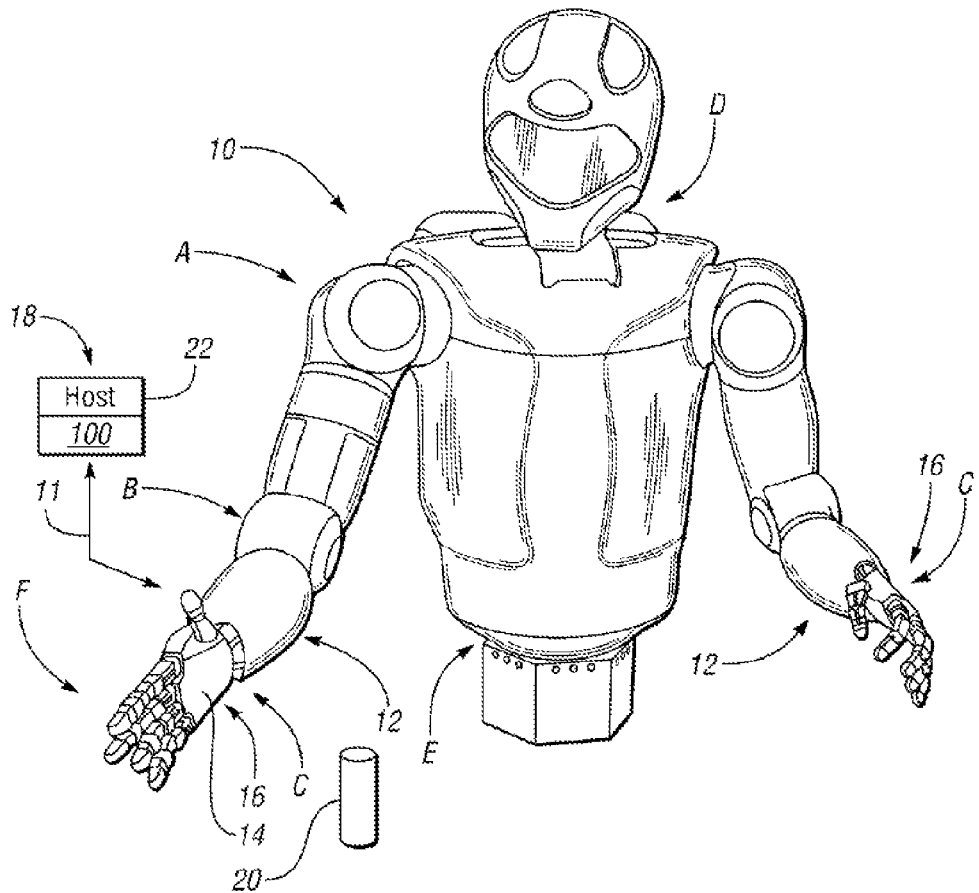
FIG. 1 is a schematic perspective view illustration of a robotic system controllable in accordance with the present invention.

With reference to the drawings, wherein like reference numbers refer to the same or similar components throughout the several views, and beginning with FIG. 1, a robotic system 10 is adapted to perform one or more dexterous and automated tasks. The robotic system 10 is configured with independently and/or interdependently-moveable robotic joints, such as but not limited to a shoulder joint, the position of which is generally indicated by arrow A. Robotic system 10 may also include an elbow joint (arrow B), a wrist joint (arrow C), a neck joint (arrow D), a waist joint (arrow E), and various finger/thumb joints (arrow F).

Additionally, the robotic system 10 includes a lower arm assembly 12 having one or more anthropomorphic and dexterous hands 14, each moveable via a wrist assembly 16. Each hand 14 may includes an opposable thumb and one or more fingers as shown, which when operated together are capable of grasping an object 20 in the same hand, or in a cooperative grasp between different hands. The wrist assembly 16 forms a closed-chain robotic mechanism that may be controlled via the method or algorithm set forth herein. While control of wrist assembly 16 is described below, the present method may also be applied to control other robotic mechanisms within the robotic system 10, as will be understood by those of ordinary skill in the art.

A host machine (HOST) 18 is adapted, via execution of a control algorithm 100, for enforcing certain defined workspace limits on the wrist assembly 16 by shaping and applying velocity control signals (arrow 11) as set forth below. Such enforcement provides an irregularly-shaped or convex-polygon workspace, and a smooth, stable operation of the wrist assembly 16 along the edge segments or edges and corners of its boundary, as described extensively below with reference to FIGS. 3-9.

Host machine 18 includes a suitably configured hardware module 22 that is electrically connected to the mechanism being controlled, e.g., the wrist assembly 16. Hardware module 22 may include a digital computer(s) or data processing device(s) having one or more microprocessors or central processing units (CPU), sufficient read only memory (ROM), and sufficient random access memory (RAM). Hardware module 22 may also include erasable electrically-programmable read only memory (EEPROM), a high-speed clock, analog-to-digital (A/D) circuitry, digital-to-analog (D/A) circuitry, and required input/output (I/O) circuitry and devices, as well as appropriate signal conditioning and buffer electronics. Individual control algorithms resident in hardware module 22 or readily accessible thereby, including algorithm 100 as described below with reference to FIG. 4, may be automatically executed by the module as needed to provide the required control functionality.

Figure 2:
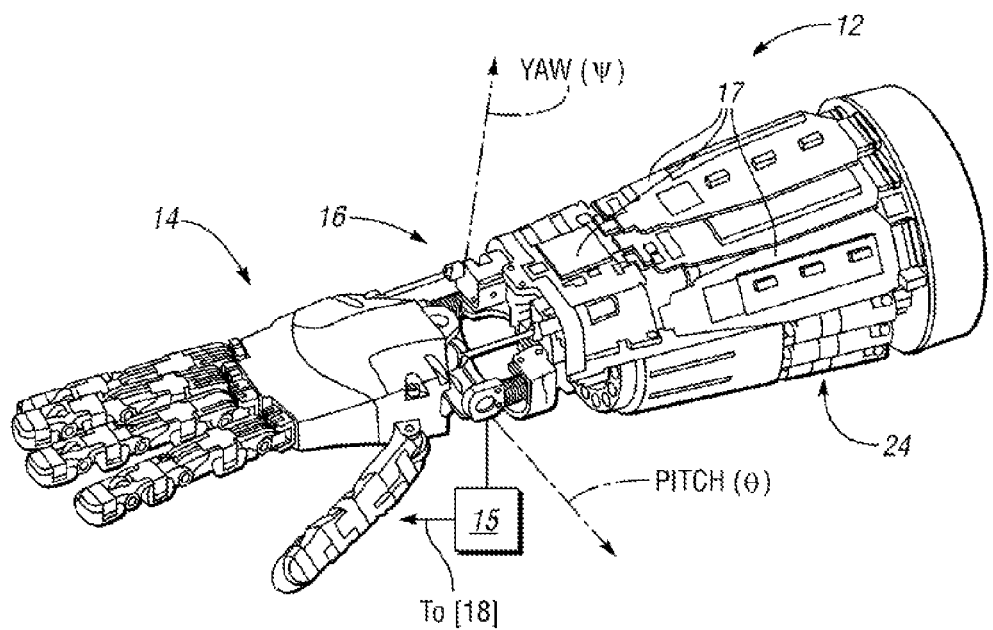
FIG. 2 is a perspective top view illustration of a lower robotic arm assembly of the robotic system shown in FIG. 1.

Referring to FIG. 2, the lower arm assembly 12 is shown in more detail to include the wrist assembly 16. As noted above, the wrist assembly 16 is a robotic mechanism suitable for control per the present method, and therefore the wrist assembly of FIG. 2 will be used hereafter for illustrative purposes. Movement of wrist assembly 16 is provided via one or more actuators 24. In one embodiment, the actuators 24, e.g., push-pull linear actuators such as tension and/or force-generating joint motors, may be embedded within the structure of the lower arm assembly 12 as shown.

Wrist assembly 16 is thus moveable in different directions, and therefore is moveable along different pitch ($\theta$) and yaw ($\psi$) axes. The position of the wrist assembly 16 can be determined via sensors 15, with the measurements from the sensors transmitted to the host machine 18 of FIG. 1. Sensors 15 may include joint sensors adapted for determining joint angles along the pitch and yaw axes, and/or other devices suitable for determining the position of a reference point on the wrist assembly 16 as set forth below, and for relaying the position information to the host machine 18 of FIG. 1. The wrist assembly 16 may be moved via the actuators 24 via indirect drives in a closed-chain mechanism, with required mapping between the actuator spaces and the joint spaces thus coupled and nonlinear, i.e., the mapping between the joint and actuator degrees-of-freedom are coupled such that the velocity of a joint is a function of the velocity of its multiple actuators. Because of this, the wrist assembly 16 has an irregularly-shaped or convex-polygon boundary of a permissible workspace, as will now be explained with reference to FIG. 3.

Figure 3:
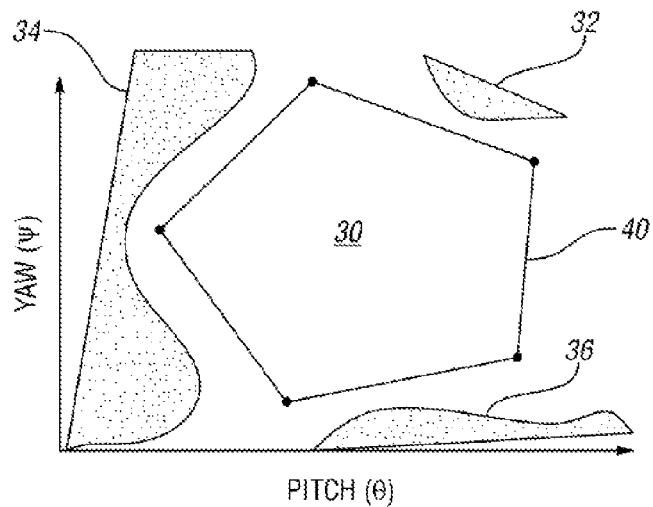
FIG. 3 is a schematic illustration of a sample convex-polygon workspace for a wrist assembly of the lower robotic arm assembly shown in FIG. 2.

Referring to FIG. 3, a permissible workspace 30 for the wrist assembly 16 shown in FIG. 2 may be defined by a convex-polygon boundary 40, a term that is understood and the art and described above. Workspace 30 may be plotted on the pitch ($\theta$) and yaw ($\phi$) axes as shown. The workspace 30 may be physically limited by many different factors. Shown schematically in FIG. 3, workspace 30 may be bounded in part by close proximity of delicate wires (feature 32), mathematical singularities (feature 34) such as pitch limits, and hard stops (feature 36), e.g., contact with a casing (not shown) for the lower arm assembly 12 of FIG. 2. Other variables, whether physical or virtual, may likewise define and/or limit the workspace 30.

The joint limits on a conventional robot are typically defined independently, which in FIG. 3 would appear as an axis-aligned rectangle. The conventional workspace may therefore be greatly expanded into a convex-polygon, for example a polygon as shown in FIG. 3, to thereby optimize performance of the wrist assembly 16. However, the expanded complex nature of the workspace results in a greatly increased level of required control complexity.

Figure 4:
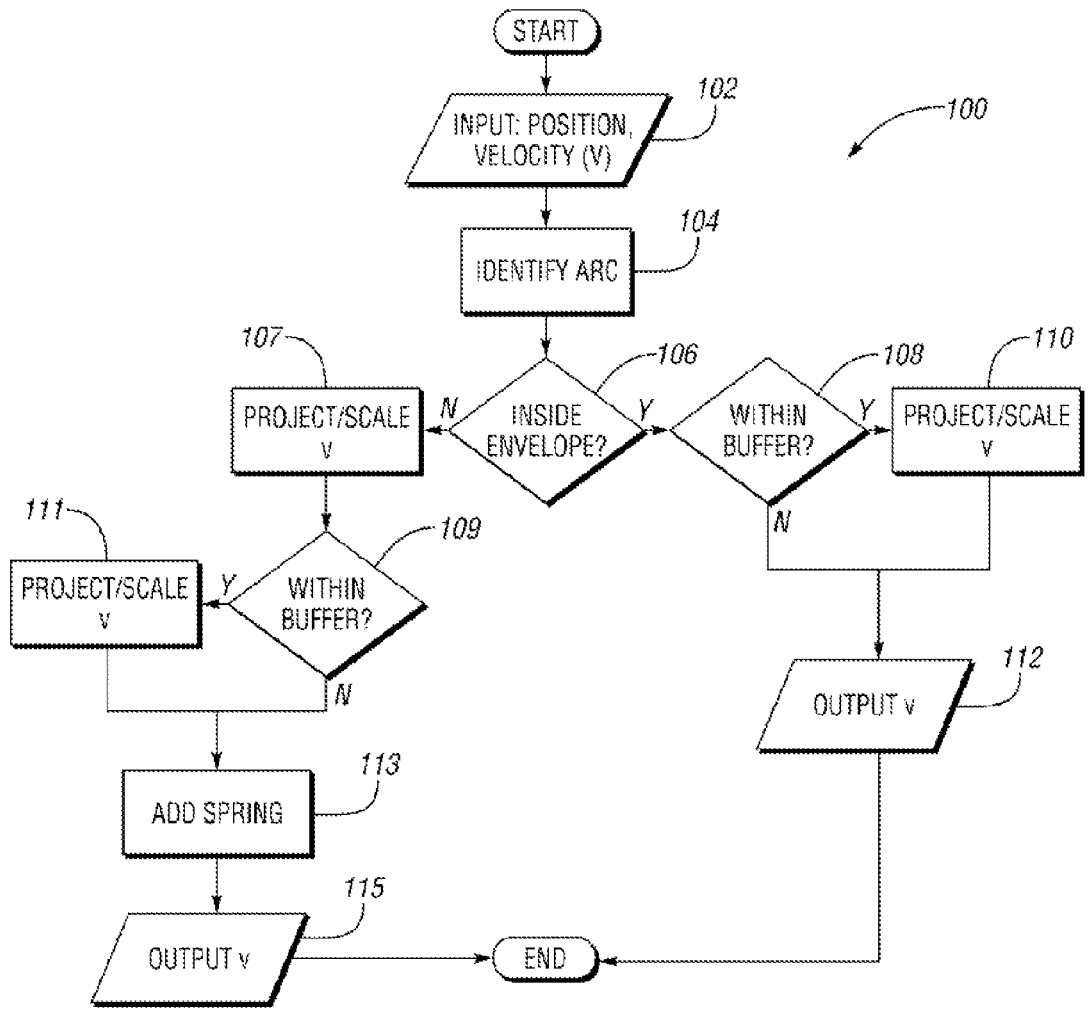
FIG. 4 is a flow chart describing a method for applying workspace limitations in the wrist assembly shown in FIG. 2.

Referring to FIG. 4, the algorithm 100 of the present invention automatically allows for velocity-based control to occur within an irregularly-shaped workspace, e.g., the workspace 30 noted above, to provide a smooth, stable, and unperturbed operation of the controlled robotic mechanism along the boundary, e.g., the boundary 40 shown in FIG. 3. Algorithm 100 therefore has two key features: (1) convex-polygon management techniques, and (2) a velocity distribution map or logic, each of which are explained further below. While two degrees of freedom (DOF) are used for conceptual illustration throughout the present work, three or more DOF may also be used as understood by those of ordinary skill in the art.

Execution of algorithm 100 automatically identifies the boundary 40 of workspace 30 using an arc segment test, determines if a reference point (P) in the arc of the mechanism lies within the workspace 30, and shapes the velocity control signals 11 of FIG. 1 as a function of the distance of the reference point (P) from the boundary 40. In one embodiment, the host machine 18 of FIG. 1 shapes and applies an output velocity via signals 11 to the mechanism in one manner if the reference point (P) lies outside of the workspace 30, and applies the output velocity in another manner if the reference point (P) lies inside the workspace.

Figure 5:
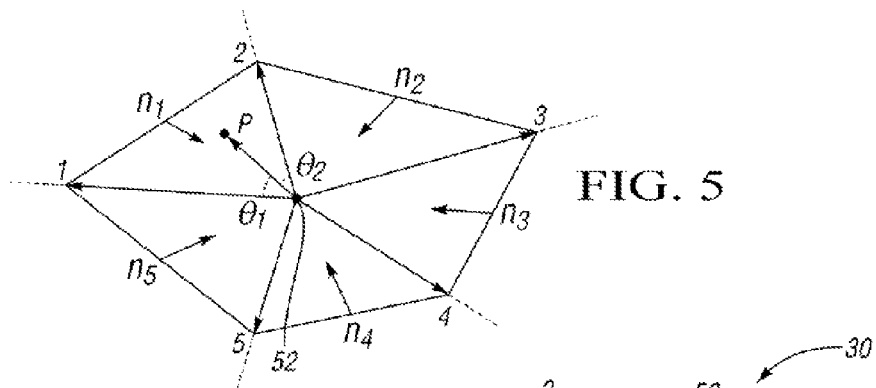
FIG. 5 is a schematic illustration of a convex-polygon usable for enforcing workspace limits on the wrist assembly shown in FIG. 2.

Referring briefly to FIG. 5, the workspace 30 may be defined by its multiple corner points, which are progressively numbered 1-5 in the example shown. The workspace 30 can be divided into different adjacent arc segments 50 (see FIG. 6), as defined by the lines drawn radially-outward from centroid 52. The identification of the particular arc segment 50 in which reference point (P) lies plays an important function in the subsequent velocity shaping logic set forth below.

Referring again to FIG. 4, algorithm 100 begins with step 102, wherein a desired velocity is input into the host machine 18 shown in FIG. 1 as velocity control signals 11, and the current position of the wrist assembly 16 is determined, e.g., using sensors 15 or other suitable means. The current position is the reference point (P) noted above. The algorithm 100 then proceeds to step 104.

Figure 6:
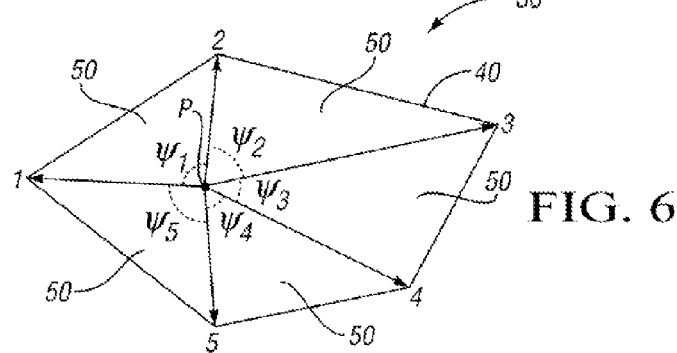
FIG. 6 is another schematic illustration of a convex-polygon usable for enforcing workspace limits on the wrist assembly shown in FIG. 2.

At step 104, the arc segment 50 of wrist assembly 16 is identified. Referring to FIG. 6, the angles ($\phi_1$-$\phi_5$) subtending the vectors from a reference point (P) on the mechanism to each other are shown. The algorithm 100 determines within which particular arc segment 50 the reference point (P) lies. The answer determines which line segment of boundary 40, and which corresponding normal vector, to use for the velocity shaping steps described below.

$\theta_i$ may be considered the angle between $\hat{r}_{CP}$ and $\hat{r}_{C1}$, as shown in FIG. 5, with C referring to the centroid 52. To test if a reference point (P) lies in the segment "12" of FIG. 5, for example, the following two conditions must be satisfied:

$$(r_{CP} \times r_{C1}) \cdot \hat{k} (r_{CP} \times r_{C2}) \cdot \hat{k} < 0$$

$$\theta_1 + \theta_2 < \pi$$

where $\hat{k}$ represents the unit vector out of the plane. The first condition ensures that reference point (P) lies between either of the two corner vectors, $r_{C1}$ and $r_{C2}$, or the negatives of the two corner vectors, $-r_{C1}$ and $-r_{C2}$. The second condition eliminates the latter possibility. While inside the envelope of workspace 30 one might simply find the closest line segment, outside of the envelope doing so might identify an incorrect border line. For illustrative purposes it is assumed herein that reference point (P) lies in the segment '12', and that it lies closer to the right edge than the left, i.e., $\theta_2 < \theta_1$. Accordingly, $n_1$ is the primary normal and $n_2$ the secondary normal as shown in FIG. 5. In the same sense, $d_1$ refers to the distance from reference point (P) to a primary boundary, and $d_2$ is the distance to a secondary boundary, as set forth below.

Referring again to FIG. 4, at step 106 the host machine 18 of FIG. 1 determines whether reference point (P) lies within the envelope of boundary 40. If so, the algorithm 100 proceeds to step 108. If reference point (P) does not lie within the boundaries 40, the algorithm 100 proceeds to step 107.

Step 106 may be accomplished in two ways. First, consider the vectors drawn from reference point (P) to each other, $r_{Pi}$, as shown in FIG. 6. $\phi_i$ represents the angle between two consecutive vectors. Angles between vectors may be defined in the range $[0, \pi]$. Reference point (P) will lie in the envelope of the workspace 30 if and only if:

$$\sum_{i=1}^{n} \phi_i = 2\pi.$$

The second way, which is scalable to higher DOFs, involves looking at the normal vectors for each line segment of the boundary 40. Let $n_i$ represent the unit vector in the normal direction for segment i. This normal must be defined pointing into the workspace 30. The normal vectors will thus be derived with respect to the centroid 52, since the centroid is guaranteed to lie inside the workspace 30. Thus:

$$\tilde{n}_i \doteq r_{iC} - \left(\frac{r_{iC} \cdot r_{i(i+1)}}{r_{iC} \cdot r_{iC}}\right) r_{iC}$$

$$n_i = \frac{\tilde{n}_i}{\|\tilde{n}_i\|}$$

Note that the count (i+1) rolls over to 1 when i=n. Accordingly, reference point (P) lies within the envelope if and only if:

$$r_{iP} \cdot n_i > 0, \forall i.$$

At step 107, the host machine 18, having determined the correct arc at step 104 and that reference point (P) lies outside of the boundary of workspace 30 at step 106, projects and scales or shapes the velocity control signals 11, and then proceeds to step 109. Velocity control signals 11 for the wrist assembly 16 need to be automatically shaped so as to enforce the boundaries 40 in software. As will be understood by those of ordinary skill in the art, due to the coupled mapping between the DOFs and the actuators 24 of the wrist assembly 16 of FIG. 2, the boundary 40 cannot be implemented in hardware using simple joint limits.

Figure 7:
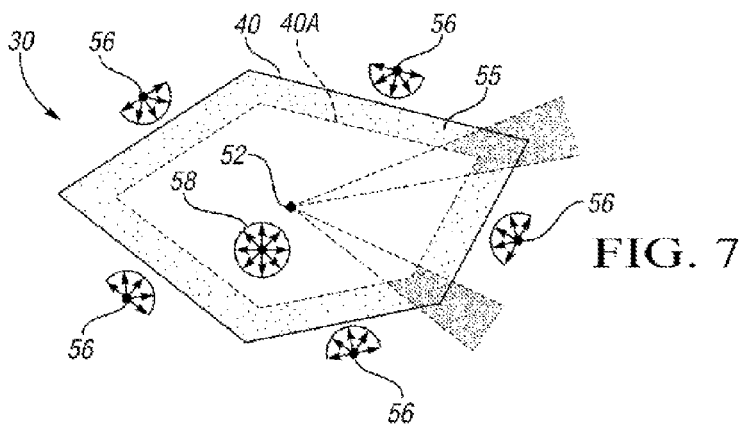
FIG. 7 is a schematic illustration of a convex-polygon workspace used to explain velocity distribution for the wrist assembly shown in FIG. 2.

Referring to FIG. 7, a snapshot is shown of allowable velocity distribution patterns 56, 58 with respect to the boundary 40. These distribution patterns 56, 58 reflect two key considerations. First, when the reference point (P) lies outside of the workspace 30, any normal component pointing away from the boundary 40 should be automatically zeroed by the host machine 18. This step keeps the reference point (P) from moving away from the boundary 40 while still permitting tangential velocities along the boundary. These tangential velocities are important to allow the controlled robotic mechanism, e.g., the wrist assembly 16, to move freely without software-induced stick and/or slip, and to allow the reference point (P) to find the point on the boundary 40 that is closest to a desired point. Second, any transitions from one region of allowable velocities to another should be continuous and gradual in order to avoid instabilities and chatter. These transitions occur at both the edges and the corners of the boundary 40, as shown in FIG. 7.

Therefore, if the reference point (P) is determined to lie outside of the envelope of boundary 40, any velocity component pointing away from the boundary is automatically zeroed. This results in the semi-circular velocity distribution patterns 56 as shown in FIG. 7. In addition, a velocity component pointing back to the boundary 40 and proportional to the distance from the boundary is superimposed.

At step 108, and as shown in FIG. 7, when operating within the workspace 30 the algorithm 100 of FIG. 4 determines whether reference point (P) lies within a predetermined buffer 55, which is defined as the area between the boundary 40 and a predetermined inner boundary 40A. If this buffer 55 is defined by a distance ($d_{max}$), the following equations may be used:

$$\hat{d}_i \doteq 1 - \frac{di}{d\max}$$

$$v_o = \begin{cases} v - \hat{d}_1(v \cdot n_1)n_1, & (v \cdot n_1 < 0) \wedge (d_1 < d_{max}) \\ v, & \text{else} \end{cases}$$

If the reference point (P) is outside of the buffer 55, the algorithm 100 proceeds to step 112, otherwise proceeding to step 110 when the reference point (P) is within the buffer.

At step 109, the host machine 18 determines whether the reference point (P) is within buffer 55 of FIG. 7, and proceeds to step 111 if it is. Otherwise, the algorithm 100 proceeds to step 113.

At step 110, having determined at step 108 that reference point (P) lies within the buffer 55, the host machine 18 of FIG. 1 either blends the normal component along the boundary 40, or it accounts for blended transitions at each corner of the workspace 30, depending on where the reference point (P) is located. That is, when reference point (P) is within the buffer 55 and the velocity is pointed towards the boundary 40, the normal component of the velocity is gradually dropped to zero to provide a continuous transition from inside to outside.

When operating in a corner of the workspace 30, as a point inside the envelope approaches the primary boundary or boundary 40, any normal component of velocity is scaled down by the host machine 18. That is, the component of a desired velocity pointing outwards in the normal direction with respect to a neighboring segment of the boundary 40 is gradually decreased. In addition, as the point enters a corner and approaches inner boundary 40A, the tangential velocity is also scaled down. Using a two-stage projection, the first stage scales down the normal component with respect to the inner boundary 40A. The second projection scales down the normal component with respect to the primary boundary, i.e., boundary 40. The new rule for the points inside the envelope at the corners is:

$$v' = \begin{cases} v - \hat{d}_2(v \cdot n_2)n_2, & (v \cdot n_2 < 0) \wedge (d_2 < d_{max}) \\ v, & \text{else} \end{cases}$$

$$v_o = \begin{cases} v' - \hat{d}_1(v' \cdot n_1)n_1, & (v' \cdot n_1 < 0) \wedge (d_1 < d_{max}) \\ v', & \text{else} \end{cases}$$

The algorithm 100 then proceeds to step 112.

At step 111, the host machine 18 projects and scales the velocity control signals 11, and proceeds to step 113.

At step 112, the host machine 20 maintains the desired velocity, i.e., it outputs a velocity control signals 11 with no changes. The algorithm 100 is finished.

At step 113, a virtual or software-based "spring" is added that is proportional to the distance of the reference point (P) from the boundary 40, i.e., f=kΔx. The wrist assembly 16 is forced back to the boundary 40 in software, and velocity is scaled to zero at the boundaries.

Figure 8:
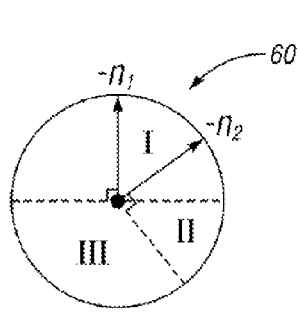
FIG. 8 is a unit circle showing velocity distribution at a corner of the convex-polygon workspace of FIG. 7.
Figure 9:
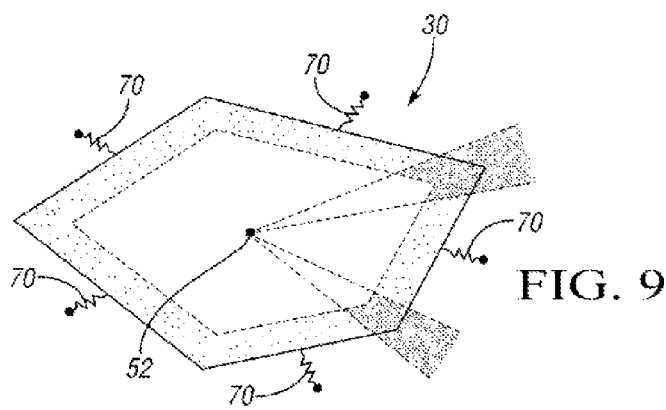
FIG. 9 is a schematic illustration of a software spring-enforced convex-polygon workspace of the wrist assembly shown in FIG. 2.

Referring to FIG. 8, in understanding the transition needed for a virtual spring component, consider the vector from a corner to reference point (P), or $r_{2P}$, and project it onto a unit circle 60. An ideal solution would apply the spring definition, $v_s = kd_1 n_1$, to all cases except where $r_{2P}$ lies in region I. In region I, the spring would be based on the vector to the corner: $v_s = -kr_{2P}$. k is the proportional gain. The result is a continuous and smooth spring value as reference point (P) moves from one segment to the next. Unfortunately, trying to determine the relative location of reference point (P) to the unit circle 60 would introduce a non-trivial amount of extra computation. The location of the unit circle 60 is independent of the results from the arc segment test noted above, and requires several new angle computations.

Alternately, an approximate solution may be determined that performs satisfactorily and that utilizes the previously computed data. This solution considers the corner angle, $\theta_2$, and blends the two adjacent normals to provide a continuous change in direction from one arc segment to the next. The new rule for the spring component is as follows:

$$v_s = \begin{cases} kd_1((1-\hat{\theta}_2)n_1 + \hat{\theta}_2 n_2), & \theta_2 < \theta_{max} \\ kd_1 n_1, & \text{else} \end{cases}$$

Virtual springs 70, i.e., software generated to systematically enforce the rules set forth above, are thus employed by the host machine 18 to enforce the boundary 40, with the velocity component $v_s = kd_1 n_1$. In particular, the spring component provided by virtual springs 70 is needed for back-drivable systems, as that term is understood in the art. Let v refer to the initially desired velocity, and $v_o$ to the output commanded after velocity shaping. The following rule defines velocity inside and outside the envelope:

$$v' = \begin{cases} v - (v \cdot n_1)n_1 + v_s, & v \cdot n_1 < 0 \\ v + v_s, & \text{else} \end{cases}$$

$$v_o = \begin{cases} v' - \hat{d}_1(v' \cdot n_1)n_1, & (v' \cdot n_1 < 0) \wedge (d_1 < d_{max}) \\ v', & \text{else} \end{cases}$$

This rule provides a continuous transition to the sides and corners of the workspace 30, however, the transition across the arc segment may be discontinuous. As the reference point (P) crosses from one arc segment to the next, the primary and secondary borders swap places. If the two are orthogonal, $n_1 \cdot n_2 = 0$, the transition will be continuous. Otherwise, a minor discontinuity will exist according to the degree of non-orthogonality.

Therefore, at step 115, the algorithm 100 outputs the velocity control signals 11 to the wrist assembly 16. The algorithm 100 is finished.

While the best modes for carrying out the invention have been described in detail, those familiar with the art to which this invention relates will recognize various alternative designs and embodiments for practicing the invention within the scope of the appended claims.

The invention claimed is:
1. A robotic system comprising:
a robotic mechanism responsive to velocity control signals, wherein the robotic mechanism has at least two degrees of freedom and a permissible workspace defined by respective axes of the robotic mechanism; and
a host machine configured to control an operation of the robotic mechanism, and to apply a convex-polygon boundary to the permissible workspace, wherein the boundary has a centroid and is defined by multiple edges and corner points, and includes a buffer that is surrounded by the multiple edges, wherein the host machine includes an algorithm, the execution of which by the host machine causes the host machine to:
determine a position of a reference point on the robotic mechanism with respect to the boundary;
divide the workspace into a plurality of arc segments defined by line segments drawn radially-outward from the centroid to the corner points; and
enforce the boundary by automatically shaping the velocity control signals as a function of the position of the reference point with respect to the buffer, the corner points, and the line segments using an arc segment test, thereby providing a smooth and unperturbed operation of the robotic mechanism along the edges and corners of the boundary.

2. The robotic system of claim 1, wherein the robotic mechanism is a robotic wrist assembly having an open wrist joint.

3. The robotic system of claim 2, wherein joints of the robotic wrist assembly are actuated by at least one indirect drive actuator in a closed-chain, wherein the joint degrees of freedom and the actuator degrees of freedom are coupled.

4. The robotic system of claim 1, wherein the host machine is configured to determine a distance of the reference point from the boundary when the reference point lies outside of the boundary, and to superimpose a velocity component that is proportional to the determined distance onto the velocity control signals, and wherein the velocity control component points back to the boundary.

5. The robotic system of claim 1, wherein the host machine is configured to:
  when the reference point lies outside of the boundary:
    automatically zero a normal velocity component of a velocity of the robotic mechanism pointing away from the boundary, and superimpose a velocity component pointing toward the boundary, such that the reference point is prevented from moving away from the boundary while still permitting velocities of the robotic mechanism that are tangential to the boundary;
  when the reference point lies within the boundary but outside of the buffer:
    control the robotic mechanism via the velocity control signals without modifying the velocity control signals;
  when the reference point lies inside of the boundary within the buffer outside of one of the corners, and the reference point is approaching the boundary:
    gradually zero a normal component of the velocity pointing toward the boundary so as to provide a continuous transition across the boundary; and
  when the reference point is in one of the corners and is approaching the boundary:
    scale down a normal component pointing toward a neighboring one of the line segments.

6. The robotic system of claim 1, wherein the respective axes are a pitch axis and a yaw axis.

7. A host machine adapted for use within a robotic system having a robotic mechanism responsive to velocity control signals, wherein the robotic mechanism has at least two degrees of freedom and a permissible workspace defined by a convex-polygon boundary having a centroid and defined by multiple edges and corner points, and including a defined buffer surrounded by the multiple edges, the host machine comprising:
  a hardware module configured to control an operation of the robotic mechanism, and further configured to determine a position of a reference point on the robotic mechanism with respect to the convex-polygon boundary; and
  a recorded algorithm;
  wherein execution of the recorded algorithm by the hardware module causes the host machine to:
    determine the position of the reference point with respect to the buffer, the corner points, and the edges;
    divide the permissible workspace into a plurality of arc segments defined by line segments drawn radially-outward from the centroid to the corner points;
    enforce the boundary by automatically shaping the velocity control signals as a function of the position of the reference point with respect to the buffer, the corner points, and the line segments using an arc segment test, thereby providing a smooth and unperturbed operation of the robotic mechanism along the edges and corners of the boundary.

8. The host machine of claim 7, wherein the host machine is configured to determine a distance of the reference point from the boundary when the reference point lies outside of the boundary, and to superimposing a velocity component onto the velocity control signals that points back to the boundary and is proportional to the determined distance.

9. The host machine of claim 7, wherein the execution of the recorded algorithm by the hardware module causes the host machine to:
  when the reference point lies outside of the boundary:
    automatically zero a normal velocity component of a velocity of the robotic mechanism pointing away from the boundary, and superimpose a velocity component pointing toward the boundary, such that the reference point is prevented from moving away from the boundary while still permitting velocities of the robotic mechanism that are tangential to the boundary;
  when the reference point lies within the boundary but outside of the buffer:
    control the robotic mechanism via the velocity control signals without modifying the velocity control signals;
  when the reference point lies inside of the boundary within the buffer outside of one of the corners, and the reference point is approaching the boundary:
    gradually zero a normal component of the velocity pointing toward the boundary so as to provide a continuous transition across the boundary; and
  when the reference point is in one of the corners and is approaching the boundary:
    scale down a normal component pointing toward a neighboring one of the line segments.

10. The host machine of claim 7, wherein one dimension of the workspace describes the pitch of the robotic mechanism and another dimension of the workspace describing the yaw of the robotic mechanism.

11. A method for enforcing a convex-polygon boundary of a permissible workspace for a robotic mechanism having at least two degrees of freedom, the boundary having a centroid and defined by multiple edges and corner points, and including a buffer surrounded by the multiple edges, the method comprising:
  determining whether a reference point on the robotic mechanism lies within the boundary;
  dividing the permissible workspace into a plurality of arc segments defined by line segments drawn radially-outward from the centroid to the corner points; and
  automatically shaping the velocity control signals as a function of the position of the reference point with respect to the buffer, the corner points, and the line segments, using an arc segment test, thereby providing a smooth and unperturbed operation of the robotic mechanism along the perimeter and within the corners of the boundary.

12. The method of claim 11, further comprising:
  determining a distance of the reference point from the boundary when the reference point lies outside of the boundary; and
  superimposing a velocity control component onto the velocity control signals, via the host machine, such that the velocity component points back to the boundary is proportional to the distance.

13. The method of claim 11, further comprising:
when the reference point lies outside of the convex-polygon boundary:
automatically zeroing a normal component of a velocity of the mechanism pointing away from the boundary and superimposing a velocity component pointing toward the boundary, such that the reference point is prevented from moving away from the boundary while still permitting velocities of the robotic mechanism that are tangential to the boundary;
when the reference point lies within the boundary outside of the buffer:
controlling the mechanism via the velocity control signals without modifying the velocity control signals;
when the reference point lies inside of the boundary within the buffer, outside of one of the corners, and reference point is approaching the boundary:
gradually zeroing a normal component of the velocity pointing toward the boundary so as to provide a continuous transition across the boundary; and
when the reference point is in a corner and approaching the boundary:
scaling down a normal component pointing toward a neighboring one of the line segments.

14. The method of claim 11, wherein the two degrees of freedom are defined by the pitch and yaw axes of the robotic mechanism.

\* \* \* \* \*